United States Patent
Nickolaou et al.

(10) Patent No.: US 8,798,841 B1
(45) Date of Patent: Aug. 5, 2014

(54) SYSTEM AND METHOD FOR IMPROVING SENSOR VISIBILITY OF VEHICLE IN AUTONOMOUS DRIVING MODE

(71) Applicant: GM Global Technology Operations LLC, Detroit, MI (US)

(72) Inventors: James N. Nickolaou, Clarkston, MI (US); Joel Pazhayampallil, Bellerose, NY (US); Michael P. Turski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/827,745

(22) Filed: Mar. 14, 2013

(51) Int. Cl.
*G05D 1/00* (2006.01)
(52) U.S. Cl.
USPC ................. 701/23; 701/26; 701/28; 340/435; 340/436
(58) Field of Classification Search
USPC ................................ 701/23, 26, 28, 245, 259
See application file for complete search history.

(56) References Cited

U.S. PATENT DOCUMENTS

| | | | | |
|---|---|---|---|---|
| 5,521,579 | A * | 5/1996 | Bernhard | 340/438 |
| 7,307,545 | B2 * | 12/2007 | Nishida | 340/901 |
| 2009/0299573 | A1 * | 12/2009 | Thrun et al. | 701/41 |
| 2010/0152963 | A1 * | 6/2010 | Heckel et al. | 701/34 |
| 2012/0083960 | A1 * | 4/2012 | Zhu et al. | 701/23 |
| 2012/0109610 | A1 * | 5/2012 | Anderson et al. | 703/8 |
| 2013/0245877 | A1 * | 9/2013 | Ferguson et al. | 701/23 |

* cited by examiner

*Primary Examiner* — John R Olszewski
*Assistant Examiner* — Nicholas K Wiltey
(74) *Attorney, Agent, or Firm* — Lionel D. Anderson; Reising Ethington P.C.

(57) ABSTRACT

A system and method designed to improve sensor visibility for a host vehicle operating in an autonomous driving mode when one or more forward-looking sensors are being occluded or obstructed. According to an exemplary embodiment, when a forward-looking object detection sensor is being obstructed by a target vehicle located closely ahead of the host vehicle, the method determines if lateral movement by the host vehicle within its own lane is appropriate to improve sensor visibility around the target vehicle. If lateral movement is deemed appropriate, the method generates lateral movement commands that dictate the direction and distance of the lateral movement by the host vehicle. This may enable the object detection sensors to at least partially see around the obstructing target vehicle and improve the preview distance of the sensors.

21 Claims, 4 Drawing Sheets

SYSTEM AND METHOD FOR IMPROVING SENSOR VISIBILITY OF VEHICLE IN AUTONOMOUS DRIVING MODE

FIELD

The present invention relates generally to vehicles having automated or autonomous driving modes, and more particularly, to systems and methods that improve sensor visibility of vehicles when they are operating in such driving modes.

BACKGROUND

It is known for host vehicles to be equipped with one or more automated, autonomous or semi-autonomous driving modes, such as adaptive cruise control (ACC), automated lane centering, automated lane keeping, or automated collision avoidance. These driving modes may utilize forward-looking sensors having a field of view extending a certain distance ahead of the host vehicle (i.e., preview distance) that can detect the presence of target vehicles and other objects, as well as features in the upcoming road segment. Autonomous and semi-autonomous driving modes typically utilize the sensor readings and other information provided by these forward-looking sensors, as well as other sensors and devices, to control a particular aspect of driving.

If a target vehicle located ahead of the host vehicle is in relatively close proximity, the target vehicle may occlude or otherwise obstruct one or more of the forward-looking sensors. This, in turn, can reduce the field of view or preview distance of the obstructed sensor and can limit the functionality of autonomous or semi-autonomous driving modes that rely upon the sensor for information.

SUMMARY

According to one aspect, there is provided a method for improving sensor visibility of a host vehicle operating in an autonomous driving mode. The method may comprise the steps of: determining if an object detection sensor is obstructed by a target vehicle located ahead of the host vehicle; when the object detection sensor is obstructed by the target vehicle, determining if lateral movement by the host vehicle within a host vehicle lane is appropriate to improve sensor visibility around the target vehicle; when lateral movement by the host vehicle within the host vehicle lane is appropriate, generating lateral movement commands that cause a lateral movement by the host vehicle within the host vehicle lane; and executing the lateral movement commands while the host vehicle is operating in the autonomous driving mode so that sensor visibility around the target vehicle is improved.

According to another aspect, there is provided a system for improving sensor visibility of a host vehicle in an autonomous driving mode. The system may comprise: an object detection sensor configured to generate readings relating to one or more target vehicles ahead of the host vehicle; and a control module configured to: determine if the object detection sensor is occluded by a target vehicle disposed ahead of the host vehicle; when the object detection sensor is occluded, determine if lateral movement of the host vehicle is appropriate; and when it is determined that lateral movement of the host vehicle is appropriate, determine lateral movement commands that include a lateral direction and a lateral distance that cause the host vehicle to laterally move so that a preview distance of the occluded object detection sensor is improved yet the host vehicle remains within a host vehicle lane.

DRAWINGS

Preferred exemplary embodiments will hereinafter be described in conjunction with the appended drawings, wherein like designations denote like elements, and wherein.

DESCRIPTION

The system and method described herein are designed to improve sensor visibility for a host vehicle operating in an automated, autonomous, or semi-autonomous driving mode when one or more forward-looking sensors are being occluded or obstructed. Obstruction of a forward-looking sensor can reduce its field of view or preview distance, which in turn can affect the operation of an automated, autonomous, or semi-autonomous driving mode that relies upon the sensor for feedback. According to an exemplary embodiment, when a forward-looking object detection sensor is being obstructed by a target vehicle located closely ahead of the host vehicle, the method determines if lateral movement by the host vehicle within its own lane is appropriate to improve sensor visibility around the target vehicle. This is sometimes referred to as a "peek-out" maneuver. If lateral movement is deemed appropriate, the method generates lateral movement commands that dictate the direction and distance of the lateral movement by the host vehicle. This may enable the object detection sensors to at least partially see around the obstructing target vehicle and improve the preview distance of the sensors so that useful information can be provided back to the autonomous or semi-autonomous driving mode.

The present system and method may be used alone or in conjunction with any automated, autonomous, or semi-autonomous driving modes. "Autonomous driving mode," as used herein, broadly includes any fully-, semi-, or partially-automated or autonomous driving mode utilizing one or more of the following features: adaptive cruise control (ACC), automated lane centering, automated lane keeping, automated lane changing, automated braking, automated steering, automated collision avoidance, automated collision mitigation, vehicle flocking control and/or any other features where the vehicle automatically controls one or more aspects of driving the vehicle based on sensor feedback.

Figure 1:
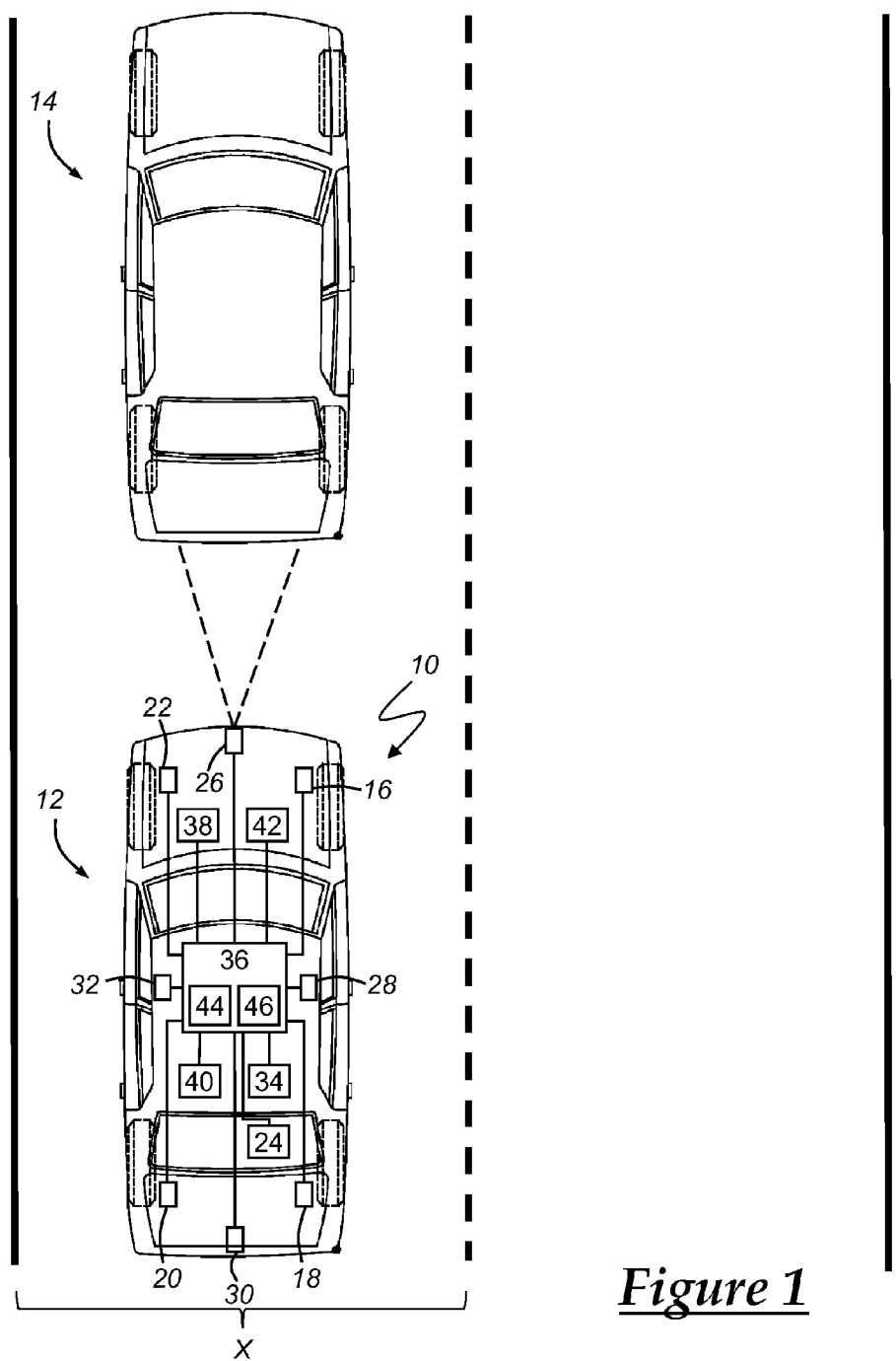
FIG. 1 is a schematic view showing an exemplary host vehicle that is operating according to an autonomous driving mode and has a target vehicle in its path.

With reference to FIG. 1, there is shown a general and schematic view of an exemplary system 10 installed on a host vehicle 12, where the system is configured to detect an obstruction of a forward-looking object detection sensor that monitors an area in front of the host vehicle, and in response to such an obstruction automatically causes a lateral movement of the host vehicle within a host vehicle lane X so that sensor visibility is improved. It should be appreciated that even though FIG. 1 only shows one target vehicle 14, the present system and method may be used in other situations or scenarios, including situations having additional target vehicles located around the host vehicle 12. These are merely some of the possible applications, as the system and method described herein may be used with any type of vehicle and are not limited to the exemplary embodiments shown in FIGS. 1-5. According to one example, system 10 includes host vehicle sensors 16-24, object detection sensors 26-32, navigation module 34, and control module 36, and is designed to interact with an engine control module 38, a brake control module 40 and/or a steering control module 42.

Any number of different sensors, components, devices, modules, systems, etc. may provide system 10 with information or input that can be used by the present method. These include, for example, the exemplary sensors shown in FIG. 1, as well as other sensors that are known in the art but are not shown here. It should be appreciated that host vehicle sensors 16-24, object detection sensors 26-32, as well as any other sensor that is a part of and/or is used by system 10 may be embodied in hardware, software, firmware or some combination thereof. These sensors may directly sense or measure the conditions for which they are provided, or they may indirectly evaluate such conditions based on information provided by other sensors, components, devices, modules, systems, etc. Furthermore, these sensors may be directly coupled to control module 36, indirectly coupled via other electronic devices, a vehicle communications bus, network, etc., or coupled according to some other arrangement known in the art. These sensors may be integrated within another vehicle component, device, module, system, etc. (e.g., sensors that are already part of an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other component, device, module, system, etc. in host vehicle 12 instead of being directly provided by an actual sensor element. In some instances, multiple sensors might be employed to sense a single parameter (e.g., for providing redundancy). It should be appreciated that the foregoing scenarios represent only some of the possibilities, as system 10 is not limited to any particular sensor or sensor arrangement and any suitable embodiment may be used.

Host vehicle sensors 16-24 provide system 10 with host vehicle readings or other information that is pertinent to host vehicle 12 and can be used by the present method. In one embodiment, host vehicle sensors 16-22 generate readings that are representative of the position, velocity and/or acceleration of host vehicle 12, while host vehicle sensor 24 provides readings representative of vehicle dynamics like lateral acceleration, yaw rate, etc. Host vehicle sensors 16-24 may utilize a variety of different sensors and sensing techniques, including those that use rotational wheel speed, ground speed, accelerator pedal position, gear shifter selection, accelerometers, engine speed, engine output, and throttle valve position, to name a few. In the example shown in FIG. 1, individual wheel speed sensors 16-22 are coupled to each of the host vehicle's four wheels and separately report the rotational velocity of the four wheels. Skilled artisans will appreciate that these sensors may operate according to optical, electromagnetic or other technologies, and that other parameters may be derived or calculated from the velocity readings, such as longitudinal or lateral accelerations. In another embodiment, host vehicle sensors 16-22 determine vehicle speed relative to the ground by directing radar, laser and/or other signals towards known stationary objects and analyzing the reflected signals, or by employing feedback from a navigation module 34 that has Global Positioning System (GPS) capabilities. Vehicle dynamics sensor 24 can be mounted under one of the front seats or at any other suitable location within host vehicle 12 and senses vehicle dynamics such as vehicle lateral acceleration and yaw rate. As mentioned above, host vehicle sensors 16-22 may be part of some other device, module, system, etc., like an anti-lock braking system (ABS).

Object detection sensors 26-32 provide system 10 with object detection readings or other information that is pertinent to one or more target vehicles 14 or other objects surrounding host vehicle 12 and can be used by the present method. In one example, object detection sensors 26-32 generate object detection readings that are representative of the presence, position, velocity and/or acceleration of target vehicles 14. These readings may be absolute in nature (e.g., a target vehicle velocity or acceleration reading) or they may be relative in nature (e.g., a relative velocity or acceleration reading which is the difference between target and host vehicle accelerations, or a relative distance reading which is the range or distance between the host and target vehicles). In another example, object detection sensors 26-32 may generate object detection readings that are representative of specific information relating to one or more target vehicles, such as dimensions (e.g., width, height, etc.) of the vehicle. In yet another example, object detection sensors 26-32 provide information relating to the upcoming or surrounding road segment, such as road conditions like road geometry (e.g., curved, straight, forked, inclined or declined road segments, degree and length of turns or bends, number and width of lanes, etc.), road indicia (e.g., lane markers, solid lines, dashed lines, double lines, reflectors, etc.), nearby road features (e.g., guard rails, barriers, shoulders, etc.), as well as non-vehicular objects in the sensor field of view. The term "object detection sensor," as used herein, broadly includes any type of sensor, camera and/or other device that is mounted on the host vehicle and gathers information regarding objects, other vehicles and/or the road itself in an area around the host vehicle. This may include both active and passive devices.

Each of the object detection sensors 26-32 may be a single sensor or a combination of sensors, and may include a light detection and ranging (LIDAR) device, a radio detection and ranging (RADAR) device, an ultrasound device, a vision device (e.g., camera, etc.), a vehicle-to-vehicle communications device, a device for receiving communications from roadside beacons or sensors, or a combination thereof. According to an exemplary embodiment, object detection sensor 26 is a forward-looking sensor and includes a camera that is mounted on the front of the vehicle, such as at the front bumper or behind the vehicle grille, and is capable of monitoring an area that is ahead of the host vehicle 12 and includes the host vehicle lane X plus portions of one or more adjacent lanes. Similar types of sensors may be used for a rearward-looking object detection sensor 30 mounted on the rear of the vehicle, such as at the rear bumper or in the rear window, and for lateral or sideward-looking object detection sensors 28 and 32 mounted on each side of the vehicle (e.g., driver and passenger sides). Other embodiments are also possible.

Navigation module 34 determines the current position of host vehicle 12 and provides corresponding information to system 10 so that it can be used by the present method. The navigation module 34 may include a telematics unit, a GPS unit and/or some other suitable device, and may use the current position of the vehicle and map data to evaluate or provide information relating to current or upcoming road segments. For instance, navigation module 34 may provide information regarding road conditions, such as road geometry (e.g., curved, straight, forked, inclined or declined road segments, degree and length of turns or bends, number and width of lanes, etc.), road indicia (e.g., lane markers, solid lines, dashed lines, double lines, reflectors, etc.), nearby road features (e.g., guard rails, barriers, shoulders, entrance and exit ramps, etc.), as well as traffic conditions (e.g., lane closures, road construction, accidents, heavy traffic flows, etc.). It is also possible for navigation module 34 to have some type of user interface so that information can be verbally, visually, or otherwise exchanged between the module and a user. Additionally, navigation module 34 may be provide navigation readings that include geographic or location information that may be used to corroborate, verify and/or otherwise supplement object detection readings provided by object detection sensors 26-32, including providing a geographic location associated with each target vehicle reading.

Control module 36 may include any variety of electronic processing devices, memory devices, input/output (I/O) devices, and/or other known components, and may perform various control and/or communication related functions. In an exemplary embodiment, control module 36 includes an electronic memory device 44 that stores various sensor readings (e.g., sensor readings from sensors 16-24 and 26-32), look up tables or other data structures, algorithms (e.g., the algorithm embodied in the exemplary method described below), etc. Memory device 44 may also store pertinent characteristics and background information pertaining to host vehicle 12, such as information relating to vehicle dimensions (e.g., width and length), stopping distances, lateral and longitudinal acceleration and deceleration limits, driver behavioral or historical data, particular sensor locations on host vehicle 12, etc. Control module 36 may also include an electronic processing device 46 (e.g., a microprocessor, a microcontroller, an application specific integrated circuit (ASIC), etc.) that executes instructions for software, firmware, programs, algorithms, scripts, applications, etc. that are stored in memory device 44 and may govern the methods described herein. Control module 36 may be electronically connected to other vehicle devices, modules, and systems via suitable vehicle communications and can interact with them when required. These are, of course, only some of the possible arrangements, functions and capabilities of control module 36, as other embodiments could also be used.

Depending on the particular embodiment, control module 36 may be a stand-alone vehicle electronic module (e.g., a sensor controller, an object detection controller, a safety controller, etc.), it may be incorporated or included within another vehicle electronic module (e.g., an active safety control module, brake control module, steering control module, engine control module, etc.), or it may be part of a larger network or system (e.g., an active safety system, a traction control system (TCS), electronic stability control (ESC) system, antilock brake system (ABS), freeway-limited autonomous driving system, adaptive cruise control system, lane departure warning system, etc.), to name a few possibilities. Accordingly, control module 36 is not limited to any one particular embodiment or arrangement and may be used by the present method to control one or more aspects of an autonomous driving mode.

As mentioned above, system 10 may interact with a number of other components, devices, modules and/or systems on host vehicle 12, including an engine control module 38, brake control module 40 and/or steering control module 42. After system 10 has determined that one or more forward-looking object detection sensors, such as object detection sensor 26, is occluded or obstructed by a nearby target vehicle 14—assuming that certain conditions are met—the system may generate and send command signals to one or more of control modules 38, 40, and/or 42 so that the host vehicle moves laterally within host vehicle lane X and improves sensor visibility around the target vehicle. These command signals could instruct the steering control module 42 to perform an automatic steering maneuver that moves host vehicle 12 in a lateral direction so that the occlusion of target sensor 26 is reduced (see, for example, FIG. 5). Similar command signals could be provided to engine control module 38 and/or brake control module 40 that cause them to perform automatic acceleration and/or braking maneuvers, respectively. Some examples of control modules that may be particularly useful with exemplary system 10 include those that utilize drive-by-wire, brake-by-wire and steer-by-wire technologies. Control modules 38, 40 and/or 42 are not limited to any particular embodiment or arrangement, as any suitable module may be used.

Again, the preceding description of exemplary system 10 and the drawing in FIG. 1 are only intended to illustrate one potential embodiment and the following method is not confined to use with only that system. Any number of other system arrangements, combinations and architectures, including those that differ significantly from the one shown in FIG. 1, may be used instead.

Figure 2:
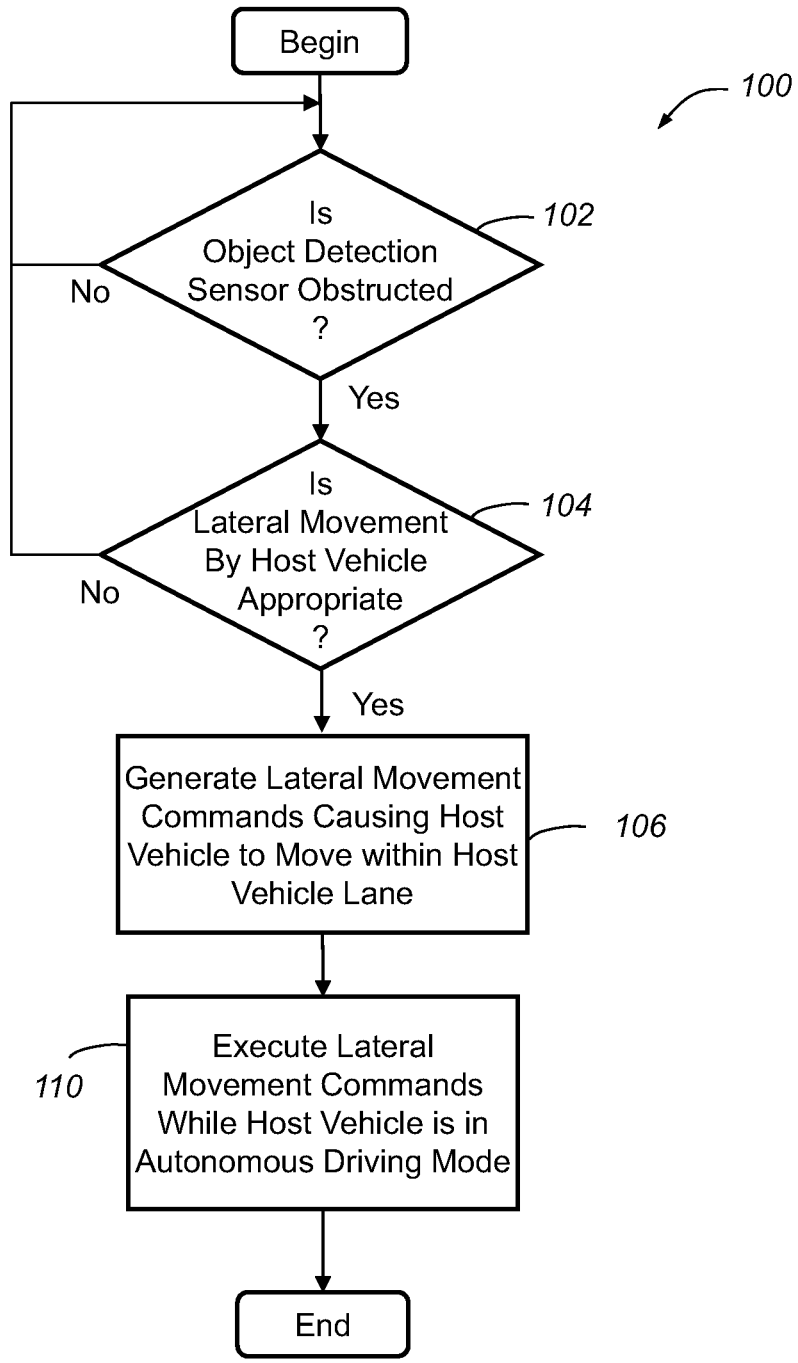
FIG. 2 is a flowchart illustrating an exemplary method that may be used to improve the sensor visibility of a host vehicle, such as the one illustrated in FIG. 1.

Turning now to FIG. 2, there is shown an exemplary method 100 that may be used with system 10 in order to improve sensor visibility for one or more object detection sensors. As described above, an obstructed object detection sensor with a reduced field of view or preview distance may not be able to fully evaluate an upcoming road segment because of the leading target vehicle, this in turn could affect operation of one or more autonomous driving modes. For example, in certain adaptive cruise control systems, the distance maintained between the host vehicle and a leading target vehicle may be on the order of about 30 m, which, depending on the sensor arrangement, may provide an obstructed preview distance of only about 35 m-40 m (see FIG. 1). If the object detection sensor is typically capable of an unobstructed preview distance on the order of 60 m-80 m, the obstructed preview distance above would mark a significant reduction in sensor visibility. In such cases, it may be helpful to detect this obstruction and, if appropriate, laterally move the host vehicle to one side or the other, yet remain in the host vehicle lane X, so that the preview distance or visibility of the obstructed object detection sensor is improved (see FIG. 5).

In the following description of the present method, it is assumed that host vehicle 12 is already being operated or driven in some type of autonomous driving mode, as defined above. However, the present method may also be utilized in non-autonomous driving modes as well. Further, for purposes of illustration and clarity, the following description of the present method is directed to a single forward-looking sensor, namely, object detection sensor 26 which is evaluated and acted on accordingly. It should be appreciated, however, that the present method is not meant to be so limited. In other potential exemplary embodiments that remain within the spirit and scope of the present method, a number of object detection sensors or other sensors may be evaluated and acted on either individually or collectively in the same manner as described below.

In step 102, the method determines if one or more object detection sensors are occluded or otherwise obstructed by an object, such as a target vehicle, located in front of the host vehicle. This evaluation—determining whether a object detection sensor is obstructed by a target vehicle 14—can be carried out in a number of different ways and could use a variety of different factors. The relative distance or spacing between the host and target vehicles, the relative position of the host and target vehicles within the host vehicle lane, and the size of the target vehicle are all non-limiting examples of factors that could be used by step 102 in order to determine if a particular object detection sensor is obstructed. Step 102 may determine if a forward-looking object detection sensor is totally obstructed, partially obstructed or slightly obstructed (hereafter collectively referred to as being "obstructed").

Figures 3, 4:
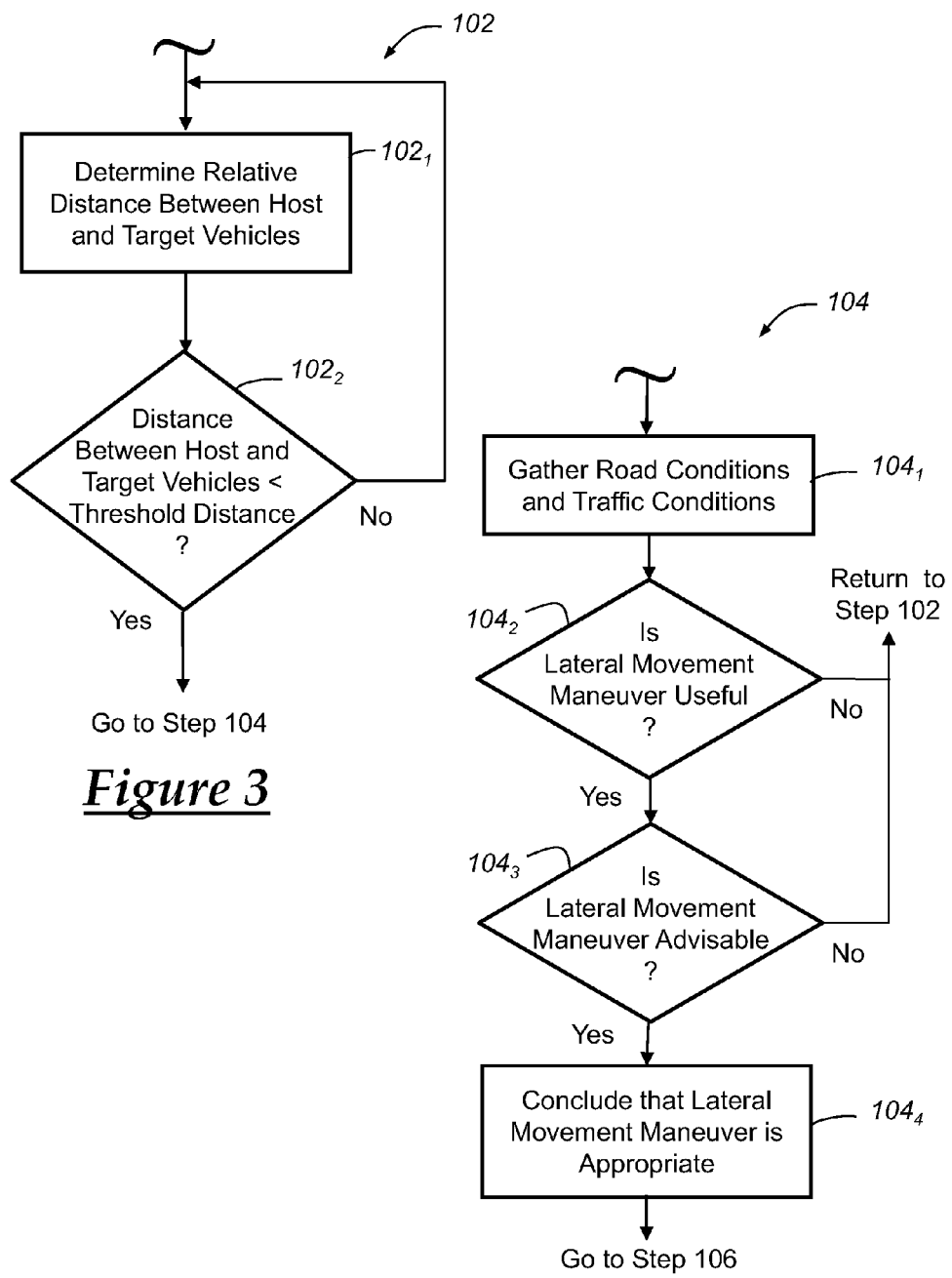
FIGS. 3-4 are flowcharts further illustrating exemplary embodiments of various steps of the method shown in FIG. 2.

In one potential embodiment of step 102, which is further illustrated by the flowchart in FIG. 3, sub-step $102_1$ determines a relative distance between host vehicle 12 and the target vehicle 14 in question, and sub-step $102_2$ compares that relative distance to a distance threshold. If the distance between the vehicles is less than the distance threshold, step 102 concludes that object detection sensor 26 is being at least partially blocked, occluded or otherwise obstructed. Sub-step $102_1$ may determine the relative distance or spacing between host and target vehicles based on the object detection readings provided by object detection sensors 26-32 and/or any other suitable device. The distance threshold in sub-step $102_2$ corresponds to the minimum spacing between host vehicle 12 and target vehicle 14 at which the target vehicle does not unacceptably limit the preview distance or field of view of object detection sensor 26, and therefore, the minimum distance at which the target vehicle does not unacceptably obstruct the sensor. The distance threshold may be a static value that is empirically-derived and saved in control module 36, for example, or it may be a dynamic value that is adjusted over time. If the distance between host vehicle 12 and target vehicle 14 is less than or equal to the distance threshold, object detection sensor 26 is considered obstructed and control passes to step 104; if the distance between the vehicles is greater than the threshold, the object detection sensor is considered non-obstructed and the method may loop back to sub-step $102_1$ for further monitoring. In a different embodiment of step 102, the method determines or calculates a preview distance for the object detection sensor in question (i.e., the distance that the sensor can current detect objects with some degree of accuracy), compares that preview distance to a threshold distance, and concludes that the object detection sensor is obstructed if the preview distance is less than the threshold distance.

Step 102 may also consider the relative position of the host and target vehicles within the host vehicle lane before deciding if an object detection sensor is currently obstructed. Consider the scenario illustrated in FIG. 1 where both the host vehicle 12 and the target vehicle 14 are approximately located in the center of the host vehicle lane X; that is, they are longitudinally aligned with one another. This arrangement generally results in a greater obstruction than when the host and target vehicles are longitudinally misaligned or offset, such as the scenario shown in FIG. 5, which can allow the object detection sensors to somewhat see around the otherwise obstructing object. Thus, when determining if a particular object detection sensor is occluded or obstructed, step 102 may consider not the just the inter-vehicle spacing, as described above, it may also consider the relative position of the vehicles within the host vehicle lane. In another potential embodiment, step 102 considers the general size and/or shape of the target vehicle 14. If, for example, the target vehicle is a large vehicle like a tractor trailer, the likelihood of sensor obstruction at a certain distance is greater than if the target vehicle is a small car or motorcycle.

Step 102 may take into account the above-listed factors, as well as others, by adjusting a threshold distance up or down. If the longitudinal misalignment or offset between the vehicles is large or if the obstructing target vehicle is rather small, then a smaller threshold distance may be used as the vehicles can be closer together without necessarily obstructing the sensor; if the longitudinal misalignment or offset is small (i.e., when the vehicles are aligned like in FIG. 1) or if the obstructing target vehicle is rather large, then a larger threshold distance may be used because a greater inter-vehicle spacing is likely needed in order to prevent a sensor obstruction. Of course, the present method is not limited to any one technique for implementing step 102.

Turning back to FIG. 2, next step 104 determines if lateral movement within the host vehicle lane is appropriate for the host vehicle to improve sensor visibility around the obstructing target vehicle. This determination can take into account many different combinations of factors, and can be a single-stage or multi-stage process, to cite several of the possibilities. For instance, step 104 may first determine if a lateral movement maneuver or peek-out maneuver would even be helpful for seeing around the obstructing target vehicle (i.e., would the maneuver likely yield a worthwhile result in terms of increasing the preview distance) and, assuming that such a maneuver would be helpful, step 104 may then determine if there are any factors that currently make performing the lateral movement maneuver unadvisable. FIG. 4 shows an exemplary embodiment of step 104, where the step uses a multi-stage process for determining the appropriateness or desirability of performing a lateral movement maneuver and includes sub-steps $104_1$-$104_3$.

In sub-step $104_1$, the method gathers road conditions, traffic conditions and/or other information that may be useful for determining the appropriateness of a lateral movement maneuver. Some examples of road conditions include information or data relating to road geometry, road indicia, and road features. As mentioned above, road geometry data pertains to the current or upcoming road segment and may include information like whether the road segment is curved, straight, forked, inclined or declined and, if so, what is the anticipated trajectory of the road segment; if the road segment is curved, then what is the degree and length of the curve or bend; the number and width of lanes in the road segment, etc. Road indicia data pertains to markings, objects and/or other indicia on the road surface and may include information regarding lane markers (solid lines, dashed lines, double lines, etc.), reflectors and/or any other items that relate to the boundaries or regulations of the current or upcoming road segment. Road feature data pertains to various types of road features that are part of, are adjacent to or are otherwise associated with an upcoming or surrounding road segment. Some non-limiting examples of road feature data include information relating to highway entrance and exit ramps, guard rails, barriers, shoulders, bridges, tunnels, etc. Of course, other road conditions may be used in lieu of or in addition to the aforementioned examples.

Traffic conditions relate to any type of traffic situation that could affect the decision regarding a potential lateral movement or peek-out maneuver, and may include information pertaining to lane closures, road construction, accidents, heavy traffic flows, oncoming traffic, surrounding traffic, etc. The information gathered in sub-step $104_1$ may be acquired or obtained from a variety of sources, such as, for example: host vehicle sensors 16-24, object detection sensors 26-32, navigation module 34, control module 36, other nearby vehicles through vehicle-to-vehicle communication, remote call centers, roadside sensors or beacons, and/or other suitable sources. It should be appreciated that the examples above of different types of road and traffic conditions are not meant to be exhaustive, as numerous other types of such data and information could be used as well.

Next, sub-step $104_2$ uses the information and data gathered in the previous step, as well as any other suitable input, to determine if a lateral movement maneuver would be helpful or useful in reducing the obstruction of object detection sensor 26 and, thus, improve overall sensor visibility. There are certain instances when performing a lateral or peek-out maneuver will probably not help improve sensor visibility. Consider an example where an upcoming road segment has a curved trajectory that is relatively severe or tight. It may not be useful to perform a lateral movement maneuver into such a tight curve as that could result in sensor 26 looking substantially across the road, as opposed to down the road, and not significantly improve the visibility around object detection sensor 26. Conversely, some road segments that are extremely straight may not result in good opportunities for seeing around the obstructing target vehicle 14, as a slight curve in the road can sometimes help the system see beyond the obstruction. In another example where the host vehicle lane is extremely narrow, such as on certain narrow country roads, there may not be enough clearance on the sides of the host vehicle to sufficiently perform a lateral movement maneuver within the host vehicle lane that is actually helpful or useful. Sub-step $104_2$ may consider any number or combination of factors when deciding the usefulness of a lateral movement maneuver, including factors not specifically listed here. If a lateral movement or peek-out maneuver is deemed useful or helpful, then the method proceeds to sub-step $104_3$; if it is determined that such a maneuver is not useful, then control of the method may return to step 102 for continued monitoring. The examples above illustrate different factors that may be used by sub-step $104_2$ to determine if a lateral movement maneuver would even be helpful; this is different than sub-step $104_3$ which determines if such a maneuver would currently be advisable, as explained below.

In sub-step $104_3$, the method uses the information and data gathered previously, as well as any other suitable input, to determine if a lateral movement maneuver is advisable at that particular moment. There could be instances where a lateral movement may be deemed useful, in that it would improve sensor visibility, but because of certain road or traffic conditions such a maneuver is not currently advisable. Consider an instance where host vehicle 12 is on a highway and is approaching an exit ramp where the host vehicle lane opens up and widens, resulting in the lane markers on the side of the lane with the exit ramp effectively disappearing for a certain distance. Such a scenario may cause confusion to system 10 which sometimes uses lane markers to execute a lateral movement maneuver, as explained below, and thus sub-step $104_3$ may consider the maneuver not advisable at that particular moment. In another example, sub-step $104_3$ may consider traffic conditions when determining the advisability of a lateral movement maneuver. If the traffic conditions indicate that there is heavy traffic near the host vehicle, either oncoming or surrounding traffic, then this sub-step may determine that it is not currently advisable to perform a peek-out maneuver and could postpone its execution to a time when the traffic has subsided. Sub-step $104_3$ could also consider the presence and nature of lane markers and, for example, determine that a lateral movement maneuver is not advisable when the sensors detect lane markers in the form of a double solid line. If a lateral movement or peek-out maneuver is deemed advisable, then sub-step $104_4$ determines that such a maneuver is appropriate and the method proceeds to step 106; if it is determined that such a maneuver is not advisable, then it is determined that the lateral movement maneuver is not appropriate and control of the method may return to step 102 for continued monitoring.

One potential way for sub-steps $104_2$ and/or $104_3$ to carry out their respective evaluations is through the use of certain predefined conditions. For example, sub-steps $104_2$ and/or $104_3$ could each use a certain combination of predefined conditions and make a decision on the usefulness and/or advisability of a lateral movement maneuver when all or some of the predefined conditions have been met.

The predefined conditions may include any of the following road geometry conditions: a road segment has greater than a minimum curvature, a road segment has less than a maximum curvature, a road segment has greater than a minimum number of lanes, a road segment does not have a split or fork for which there is not a developed route, a host vehicle lane has greater than a minimum width, a lateral distance between the host vehicle and an edge of a host vehicle lane is greater than a minimum distance, a lateral distance between the host vehicle and an edge of a host vehicle lane is greater than a lateral distance needed for the host vehicle to move in order to improve sensor visibility, or a host vehicle lane is expected to maintain a consistent width or trajectory for a certain distance. These conditions pertain to a particular road segment of interest or a portion of a host vehicle lane that is of interest; the same applies to the conditions in the following paragraphs. In the case of a split or fork in the upcoming road segment, the predefined condition may be that the host vehicle must be following a known navigation path (e.g., one developed by navigation module 34 or based on past historical data where the host vehicle routinely took one branch of the split over the other) so that it is already known which branch of the split host vehicle 12 is going to take.

The following road indicia conditions may also be embodied in the predefined conditions: a road segment has lane markers present and visible, a road segment has reflectors present and visible, a road segment does not have a double solid line, or a desired lateral movement maneuver does not violate the laws, regulations, or ordinances of a road segment, as perceived from the road indicia, map data from navigation module 34, roadside beacons, or from some other suitable source.

Any of the following road feature conditions may also be used as a predefined condition: a road segment does not have a highway entrance or exit ramp within a certain distance, a road segment does not include a bridge or tunnel, or a road segment does not include a nearby guard rail or barrier that is close to a host vehicle lane.

The following traffic conditions may also be considered as a predefined condition: no vehicle or object is located in a defined area around the host vehicle, no vehicle or object in front of the host vehicle is approaching the host vehicle in an oncoming lane, no vehicle or object behind the host vehicle is approaching the host vehicle in the host vehicle lane or an adjacent lane, traffic on a road segment is less than a certain traffic density, or the host vehicle is not approaching a construction zone or accident area. Considering these conditions may help ensure that there are no vehicles or objects in the defined area surrounding the host vehicle that the host vehicle could either contact or come close to contacting, or whose drivers may be alarmed by the lateral movement of host vehicle 12. The "defined area" may include, for example, the areas directly next to, behind and/or ahead of host vehicle 12, as well as the area commonly known as the blind spot. The object detection sensors 26-32, as well as roadside sensors or vehicle-to-vehicle communication devices, may be used to establish the defined area, as well as to determine if any vehicles or objects are present in such.

One situation where a lateral movement or peek-out maneuver by the host vehicle may be desirable and worth describing in more detail is where an obstructed host vehicle 12 and a target vehicle 14 are currently on a straight road segment (e.g., a strait away or a straight joining section between curves of opposite direction (S-curves)) and are approaching a curve in the upcoming road segment. In this situation, it is typically desirable for the system 10 to identify and locate the beginning transition point of the upcoming curve well in advance of the host vehicle 12 actually encountering it. Thus, step 104 may evaluate map and other data from navigation module 34 (road geometry conditions), conclude that a predefined condition exists relating to a curve in an upcoming road segment, and determine that a lateral movement maneuver (preferably in the direction of the curve) is useful and appropriate to help improve sensor visibility. The method may subsequently identify and locate the beginning transition point of the curve when the host vehicle is executing the lateral movement maneuver and provide that information to the autonomous driving mode.

It should be appreciated that the preceding conditions, whether they be road or traffic conditions, are merely exemplary and that the present method may certainly use other conditions or combinations of conditions instead. For example, conditions pertaining to the host or target vehicle may also be considered and used by sub-steps $104_2$ and/or $104_3$. The speed of host vehicle 12, which may be provided by sensors 16-22 or another component of system 10 as host vehicle readings, may also be taken into consideration. The present method may take the speed of the host vehicle and/or any oncoming target vehicles into account to ensure that it is safe to perform the lateral movement maneuver. In another illustration of the use of host vehicle speed, assume that there is a curved road segment ahead that would ordinarily make a lateral movement maneuver useful or desirable (first predefined condition met). If the host vehicle is traveling at a speed such that it will have passed the curved road segment before a lateral movement or peek-out maneuver can be completed (second predefined condition not met), then it may not be useful to execute such a maneuver at this time. In another example, the speed or acceleration of target vehicle 14, which may be provided by object detection sensors 26-32 or another component of system 10 as object detection readings, may be accounted for. More particularly, if it is determined that target vehicle 14 is accelerating away from host vehicle 12, the obstruction or occlusion created thereby may be eliminated or reduced without any action on the part of host vehicle 12; therefore, a lateral movement maneuver by the host vehicle may not be necessary or desirable.

Sub-steps $104_2$ and/or $104_3$ may also want to determine if there any other maneuvers or actions being taken by the host vehicle via an autonomous driving mode. A peek-out maneuver may not be advisable at the same time that the autonomous driving mode is commanding a lane centering or lane change maneuver, for example. In any event, sub-steps $104_2$ and/or $104_3$ may determine when one or more predefined conditions have been met and, if so, conclude that a lateral movement or peek-out maneuver is appropriate.

While the description of step 104 has thus far been only with respect to the specific substeps $104_1$-$104_4$, skilled artisans will appreciate that any number of techniques other than those described herein may be used to determine whether lateral movement maneuver by the host vehicle is appropriate, and such techniques remain within the spirit and scope of the present disclosure. In an exemplary embodiment, step 104 determines that a lateral movement maneuver is appropriate when one or more predefined conditions are met and determines that a lateral movement maneuver is not appropriate when one or more predefined conditions are not met. Skilled artisans will appreciate that the predefined conditions may be configured such that meeting a condition means that the maneuver is not appropriate (i.e., a negative condition). Moreover, it is not necessary that sub-steps $104_1$-$104_4$ be carried out in the precise sequence or order that is described above; for instance, sub-steps $104_2$ and $104_3$ may be performed in a different order or at the same time. All such embodiments remain within the spirit and scope of the present disclosure. If step 104 concludes that a lateral movement maneuver is appropriate, the method proceeds to step 106; if a lateral movement maneuver is deemed not appropriate, the method may loop back to step 102 for further monitoring.

Returning to FIG. 2, in step 106 the method generates lateral movement commands that cause the host vehicle to laterally move within the host vehicle lane so that sensor visibility around the obstructing target vehicle is improved. One way to carry out this step involves determining a lateral direction and a lateral distance. Any combination of factors may be taken into account or considered when making the determination of step 106, including factors that are described below and are based on road or traffic conditions previously gathered.

With respect to determining a lateral direction for the host vehicle, any suitable combination of road, traffic and/or other conditions may be utilized. For instance, road geometry data for the surrounding or upcoming road segment may be considered to take into account curves, bends, additional lanes, etc. If, for example, the surrounding or upcoming road segment is slightly curved, step 106 may determine that host vehicle 12 should laterally move towards the inside of the curve so that sensor 26 can look further down the road, as opposed to moving towards the outside of the curve which would result in the sensor being directed to an area on the side of the road. Put differently, if the road curves to the left, the lateral direction may be to the left, and if the curvature is to the right, the lateral direction may be to the right.

Road geometry data in the context of the relative position of the host vehicle lane versus the overall road may also be considered. If the host vehicle lane X has an adjacent lane on one side (regardless of direction of travel) but not on the other, step 106 may decide that host vehicle 12 should move in the direction of the adjacent lane to maximize the visualization of the road as a whole, as opposed to visualizing an area off the road, which could occur if lateral direction was away from the adjacent lane. Alternatively, if the direction of travel in the adjacent lane is opposite of that in the host vehicle lane X, step 106 may determine that the host vehicle 12 should move away from the adjacent lane so as to avoid moving towards the oncoming traffic and alarming the driver. In another embodiment, step 106 may consider both of the preceding factors and conclude that when there are adjacent lanes on both sides of the host vehicle lane X (one with traffic in the same direction and one with traffic in the opposite direction), the lateral direction should be towards the lane that is moving in the same direction.

The relative position within their lane of the host vehicle, the target vehicle, or both may also be used when determining lateral direction. Using object detection readings from object detection sensors 26-32, this step may determine if target vehicle 14 is offset to one side or another in the host vehicle lane X. If, for example, the target vehicle 14 is shifted to the right of a centerline in host vehicle lane X, step 106 may determine that the lateral direction should be to the left, and vice versa. If the target vehicle 14 is substantially centered within the host vehicle lane X, the position of host vehicle 12 within the lane may dictate the direction of lateral movement. For instance, if host vehicle 12 is already offset from the centerline of the host vehicle lane X in one direction, step 106 may determine that the host vehicle should move laterally in that same direction so as to minimize the lateral displacement of host vehicle during the lateral movement maneuver.

If the host vehicle 12 is following an already developed navigational route or if the host vehicle is on a commonly driven route, this too may be used to determine the direction of lateral movement. In this case of a split or fork in the upcoming road segment, the lateral direction should coincide with the direction of the branch that host vehicle 12 will be taking (e.g., if the branch to the right is to be taken, the lateral movement may also be to the right; while if the branch to the left is to be taken, the lateral movement should also be to the left).

With respect to determining a lateral distance for the host vehicle, any suitable combination of road, traffic and/or other conditions may be utilized. For instance, the width of the obstructing target vehicle 14 may be used to calculate the minimum amount of lateral distance or offset needed by the host vehicle 12 to resolve or at least reduce the sensor obstruction caused by target vehicle 14. In other words, knowing the width of target vehicle 14, as well as other information like the inter-vehicle spacing, may allow the method to calculate a lateral distance for the host vehicle 12 that will likely put the obstructed sensor 26 just beyond the outer boundary of the target vehicle, as opposed to moving host vehicle 12 further than necessary. These and other techniques may be used to try and minimize the lateral distance or displacement of the host vehicle 12. In another embodiment, the width of the host vehicle 12 may be factored into the lateral distance calculation to ensure that the host vehicle stay within the host vehicle lane X and does not crossover the lane markers. If the host vehicle 12 is substantially centered within the host vehicle lane X and the widths of the host vehicle and the host vehicle lane are both known (lane width could be acquired in a similar manner as described above in the context of road conditions), the lateral distance or clearance between the host vehicle and the edge of the host vehicle lane can be determined. A lateral distance may be calculated that is less than or equal to the calculated distance in order to ensure that there is enough space within the host vehicle lane X for host vehicle 12 to be moved laterally and still remain within the boundary of the lane defined by the lane marker.

Similar to one of the examples above, the relative position of the host vehicle within the host vehicle lane may be used to calculate the lateral distance or offset. Using the width of host vehicle lane X and the position of the host vehicle 12 therein, the distance between the host vehicle and the edge of the lane may be calculated. A lateral distance may then be developed that is less than or equal to the distance between the host vehicle and the edge of the lane. It is also possible for step 106 to combine or use multiple techniques, such as combining the technique above for determining the minimum amount of lateral distance needed to reduce the sensor obstruction and then comparing that lateral distance to the amount of clearance currently available between the host vehicle and the edge of the host vehicle lane.

In a different approach, step 106 may simply generate lateral movement commands that cause the host vehicle to move within a certain distance from a lane marker indicating the edge of the host vehicle lane. These lateral movement commands could, for example, instruct the host vehicle to move within 0.25 m, 0.5 m or 1.0 m of the lane marker and could employ some type of closed loop feedback technique to carry that out using output from the object detection sensors 26-32, navigation module 34 or some other device. This is somewhat different than developing a predetermined lateral distance by which the host vehicle is instructed to move.

It is also possible for the lateral movement commands in step 106 to cause the host vehicle 12 to speed up or slow down, with respect to the target vehicle 14. Altering the relative speed between the host and target vehicles can help reduce the obstruction of object detection sensor 26 and, thus, improve sensor visibility. For instance, if object detection sensor 26 is occluded by target vehicle 14, which is closely in front of host vehicle 12, step 106 could generate lateral movement commands that not only cause the host vehicle to move side-to-side within the host vehicle lane X, but could also cause the host vehicle to slow down so that the gap or distance between the two vehicles is increased. An increased gap, in lieu of or in addition to lateral movement by the host vehicle 12, may help mitigate the obstruction of object detection sensor 26 and improve sensor visibility.

While the description has thus far been with respect to the calculation of a lateral distance or offset that would keep host vehicle 12 within the host vehicle lane X throughout the performance of the lateral movement maneuver, it is contemplated that in certain other instances or embodiments, host vehicle 12 may be permitted to cross over into an adjacent lane. Accordingly, in such embodiments, the calculated lateral distance need not be confined to maintain the host vehicle within its own lane, but could allow the host vehicle to move beyond the boundary of the host vehicle lane. Such embodiments remain within the spirit and scope of the present disclosure.

Figure 5:
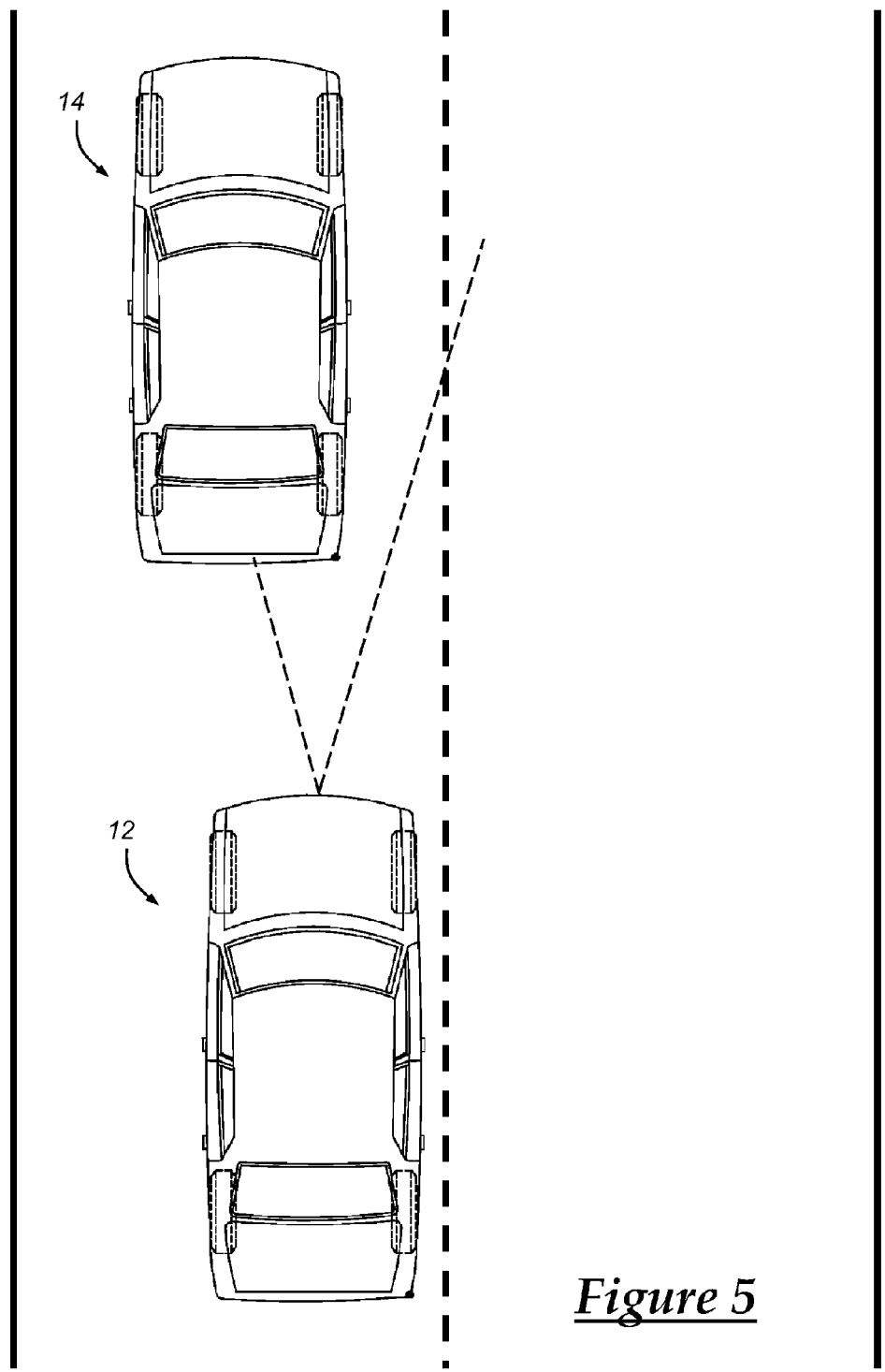
FIG. 5 is a schematic view showing an exemplary host vehicle following the performance of a lateral movement maneuver according to the method illustrated in FIG. 2.

Next, step 110 executes the lateral movement commands while the host vehicle is operating in an autonomous driving mode. According to an exemplary embodiment of step 110, the control module 36 provides the lateral movement commands, which may include a lateral direction and a lateral distance for the lateral movement or peek-out maneuver, to steering control module 42. The lateral movement commands may also, potentially, be provided to other devices like engine control module 38 and/or brake control module 40 in order to control the host vehicle speed during performance of the maneuver. These modules may then automatically execute and carry out the lateral movement commands according to any known technique in the art, and should do so in a way that is consistent with the current autonomous driving mode being employed. Execution of these commands results in a lateral shift of the host vehicle so that visibility of the object detection sensor is improved, as illustrated in FIG. 5. This, in turn, increases the preview distance or field of view compared to, for example, the scenario illustrated in FIG. 1.

It is possible for the lateral movement commands to further include a timing component that represents the amount of time available for the lateral movement maneuver to be performed and completed. This time component may be determined based on the location, speed, and/or acceleration of host vehicle 12 and/or one or more target vehicles 14 relative to host vehicle 12, and may represent how much time there is before a target vehicle is in such close proximity to host vehicle (e.g., within the "defined area" of the host vehicle) that it is no longer desirable to perform the lateral movement maneuver.

In an exemplary embodiment, one or more steps of method 100 are embodied in software or other electronic instructions that are stored on and/or executed by control module 36. It should be appreciated, however, that other components or devices of system 10 may be configured to perform one or more of the steps of method 100 and thus, the present disclosure is not limited to the particular examples provided herein. It should be further appreciated that while the steps of method 100 have been described as being performed in a certain sequential manner, the present disclosure is not so limited. It is certainly possible for two or more of the steps 102-110 to be performed simultaneously or performed in a sequential order other than that set forth above. For example, step 106 could be performed before step 108 so that the actual lateral movement commands can be evaluated for appropriateness, or the substeps $104_2$ and $104_3$ could be merged into a single step for determining appropriateness of the proposed lateral movement maneuver. In another potential embodiment, step 110 continues to monitor and evaluate the appropriateness of the lateral movement maneuver (e.g., according to the criteria of step 104) during its execution so that, if need be, the maneuver can be halted if it becomes not appropriate or not desirable.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for improving sensor visibility of a host vehicle operating in an autonomous driving mode, comprising the steps of:
   determining if an object detection sensor mounted on the host vehicle is obstructed by a target vehicle located ahead of the host vehicle and in a host vehicle lane;
   when the object detection sensor is obstructed by the target vehicle, determining if lateral movement by the host vehicle within the host vehicle lane is appropriate to improve sensor visibility around the target vehicle;
   when lateral movement by the host vehicle within the host vehicle lane is appropriate, generating lateral movement commands that cause a lateral movement by the host vehicle within the host vehicle lane to improve sensor visibility around the target vehicle located ahead of the host vehicle and in the host vehicle lane; and
   executing the lateral movement commands while the host vehicle is operating in the autonomous driving mode so that sensor visibility around the target vehicle is improved.

2. The method of claim 1, wherein the step of determining if an object detection sensor is obstructed by a target vehicle further comprises determining a relative distance between the host and target vehicles, comparing the relative distance to a threshold distance, and concluding that the object detection sensor is obstructed if the relative distance is less than the threshold distance.

3. The method of claim 2, wherein the step of determining if an object detection sensor is obstructed by a target vehicle further comprises adjusting the threshold distance up or down based on at least one factor selected from the group consisting of: a relative position of the host and target vehicles within the host vehicle lane, a size of the target vehicle, or a shape of the target vehicle.

4. The method of claim 1, wherein the step of determining if an object detection sensor is obstructed by a target vehicle further comprises determining a preview distance for the object detection sensor, comparing the preview distance to a threshold distance, and concluding that the object detection sensor is obstructed if the preview distance is less than the threshold distance.

5. The method of claim 1, wherein the step of determining if lateral movement by the host vehicle within the host vehicle lane is appropriate further comprises determining if a lateral movement maneuver is useful for increasing a preview distance of the object detection sensor and determining if the lateral movement maneuver is currently advisable.

6. The method of claim 5, wherein the step of determining if a lateral movement maneuver is useful and/or determining if the lateral movement maneuver is advisable further comprises evaluating one or more predefined conditions and concluding that the lateral movement maneuver is useful and/or advisable when the one or more predefined conditions are met.

7. The method of claim 6, wherein the one or more predefined conditions include at least one of the following road geometry conditions: a road segment is greater than a minimum curvature, a road segment is less than a maximum curvature, a road segment has greater than a minimum number of lanes, a road segment does not have a split or fork for which there is not a developed route, the host vehicle lane has greater than a minimum width, a lateral distance between the host vehicle and an edge of the host vehicle lane is greater than a minimum distance, a lateral distance between the host vehicle and an edge of the host vehicle lane is greater than a lateral distance needed for the host vehicle to move in order to improve sensor visibility, or the host vehicle lane is expected to maintain a consistent width or trajectory for a certain distance.

8. The method of claim 6, wherein the one or more predefined conditions include at least one of the following road indicia conditions: a road segment has lane markers present and visible, a road segment has reflectors present and visible, a road segment has a lane marker of a particular type, or a desired lateral movement maneuver does not violate the laws, regulations, or ordinances of a road segment.

9. The method of claim 6, wherein the one or more predefined conditions include at least one of the following road feature conditions: a road segment does not have a highway entrance or exit ramp within a certain distance, a road segment does not include a bridge or tunnel, or a road segment does not include a nearby guard rail or barrier that is close to the host vehicle lane.

10. The method of claim 6, wherein the one or more predefined conditions include at least one of the following traffic conditions: no vehicle or object is located in a defined area around the host vehicle, no vehicle or object in front of the host vehicle is approaching the host vehicle in an oncoming lane, no vehicle or object behind the host vehicle is approaching the host vehicle in the host vehicle lane or an adjacent lane, traffic on a road segment is less than a certain traffic density, or the host vehicle is not approaching a construction zone or accident area.

11. The method of claim 6, wherein the step of concluding that the lateral movement maneuver is useful and/or advisable further considers a speed, an acceleration or both of at least one of the host vehicle or the target vehicle in conjunction with evaluating the one or more predefined conditions.

12. The method of claim 1, wherein the step of determining if lateral movement by the host vehicle within a host vehicle lane is appropriate further comprises evaluating road geometry conditions, concluding that a predefined condition regarding a curve in an upcoming road segment is met, and determining that the lateral movement is appropriate to locate a beginning transition point of the curve.

13. The method of claim 1, wherein the step of generating lateral movement commands further comprises determining a lateral direction and a lateral distance that cause the host vehicle to laterally move so that sensor visibility around the target vehicle is improved yet the host vehicle remains in the host vehicle lane.

14. The method of claim 13, wherein the step of determining a lateral direction further comprises using one or more of the following conditions to select the lateral direction: a direction of a curved road segment, a relative position of the host vehicle lane in a multi-lane road segment, a direction of traffic flow in a lane adjacent the host vehicle lane, a relative position of the host vehicle in the host vehicle lane, a relative position of the target vehicle in the host vehicle lane, a vehicle path in an already developed navigational route, or a vehicle path in a commonly traveled route.

15. The method of claim 13, wherein the step of determining a lateral distance further comprises using one or more of the following conditions to calculate the lateral distance: a width or other size dimension of the target vehicle, a width or other size dimension of the host vehicle, a direction of traffic flow in a lane adjacent the host vehicle lane, a relative position of the host vehicle in the host vehicle lane, or a relative position of the target vehicle in the host vehicle lane.

16. The method of claim 13, wherein the step of determining a lateral distance further comprises using output from one or more object detection sensors and a closed loop feedback technique to laterally move the host vehicle within a predetermined distance of a lane marker.

17. The method of claim 13, wherein the lateral movement commands are designed to minimize lateral displacement of the host vehicle within the host vehicle lane.

18. The method of claim 13, wherein the lateral movement commands have a timing component that dictates an amount of time available for a lateral movement maneuver to be performed and completed.

19. The method of claim 1, wherein the step of executing the lateral movement commands while the host vehicle is operating in the autonomous driving mode further comprises providing the lateral movement commands from a control module to at least one of a steering control module, an engine control module or a brake control module so that the host vehicle performs the lateral movement while the host vehicle is operating in the autonomous driving mode.

20. A method of controlling the lateral movement of a host vehicle, comprising the steps of:
  receiving one or more electrical signals representative of a distance between the host vehicle and an object ahead of the host vehicle;
  using the received electrical signals to determine if the distance between the host vehicle and the object is less than a predetermined threshold distance;
  when the host vehicle is within the predetermined distance from the object, determining if lateral movement of the host vehicle is desirable; and
  when it is determined that lateral movement of the host vehicle is desirable, determining a direction (left or right) in which the host vehicle is to move laterally, and calculating a lateral offset distance for the host vehicle to move in that direction, wherein both the direction and the lateral offset distance are determined to maintain the host vehicle within the host vehicle lane and to improve sensor visibility around the object ahead of the host vehicle.

21. A system for controlling the lateral movement of a host vehicle, comprising:
  an object detection sensor mounted on the host vehicle configured to generate readings relating to one or more target vehicles ahead of the host vehicle and in a host vehicle lane; and
  a control module configured to:
    determine if the object detection sensor is occluded by a target vehicle disposed ahead of the host vehicle and in the host vehicle lane;
    when the object detection sensor is occluded, determine if lateral movement of the host vehicle within the host vehicle lane is appropriate; and
  when it is determined that lateral movement of the host vehicle is appropriate, determine lateral movement commands that include a lateral direction and a lateral distance that cause the host vehicle to laterally move so that a preview distance of the occluded object detection sensor is improved yet the host vehicle remains within the host vehicle lane.

* * * * *